United States Patent [19]

Dalgoutte et al.

[11] 4,383,732
[45] May 17, 1983

[54] FIBER OPTIC CONNECTOR

[75] Inventors: David G. Dalgoutte, Ilkley; Peter F. C. Burke, Leeds; John D. Archer, Halifax; Robert G. Pragnell, Leeds, all of England

[73] Assignee: International Standard Elektrik Corp., New York, N.Y.

[21] Appl. No.: 264,336

[22] Filed: May 18, 1981

Related U.S. Application Data

[63] Continuation-in-part of Ser. No. 86,727, Oct. 22, 1979, abandoned.

[30] Foreign Application Priority Data

Oct. 27, 1978 [GB] United Kingdom ............... 42222/78

[51] Int. Cl.³ .............................................. G02B 5/14
[52] U.S. Cl. ................... 350/96.20; 350/96.21
[58] Field of Search ............... 350/96.20, 96.21, 96.22; 29/464, 467, 466, 468

[56] References Cited

U.S. PATENT DOCUMENTS

| | | | |
|---|---|---|---|
| 3,861,781 | 1/1975 | Hasegawa et al. | 350/96.21 |
| 3,963,323 | 6/1976 | Arnold | 350/96.22 |
| 4,015,894 | 4/1977 | Rocton | 350/96.21 |
| 4,090,778 | 5/1978 | Phillips et al. | 350/96.20 |
| 4,135,781 | 1/1979 | Archer | 350/96.20 |
| 4,158,477 | 6/1979 | Phillips et al. | 350/96.21 |
| 4,186,998 | 2/1980 | Holzman | 350/96.21 |
| 4,351,586 | 9/1982 | Phillips et al. | 350/96.20 |

FOREIGN PATENT DOCUMENTS 52-2441 1/1977 Japan ............... 350/96.21

OTHER PUBLICATIONS

Witte et al., "A Novel Light Coupling Method for Fibers", Review of Sci. Instruments, Sep. 1971.

Primary Examiner—David K. Moore
Attorney, Agent, or Firm—T. E. Kristofferson; T. L. Peterson

[57] ABSTRACT

An optical fiber connector of the watch bearing jewel type. To prevent "growing out" of a fiber end to which the connector is terminated, a thin protective window is placed against the bearing jewel and supported by a fiber stub mounted in a second watch bearing jewel. The fiber and the fiber stub are optically coupled via the window.

6 Claims, 1 Drawing Figure

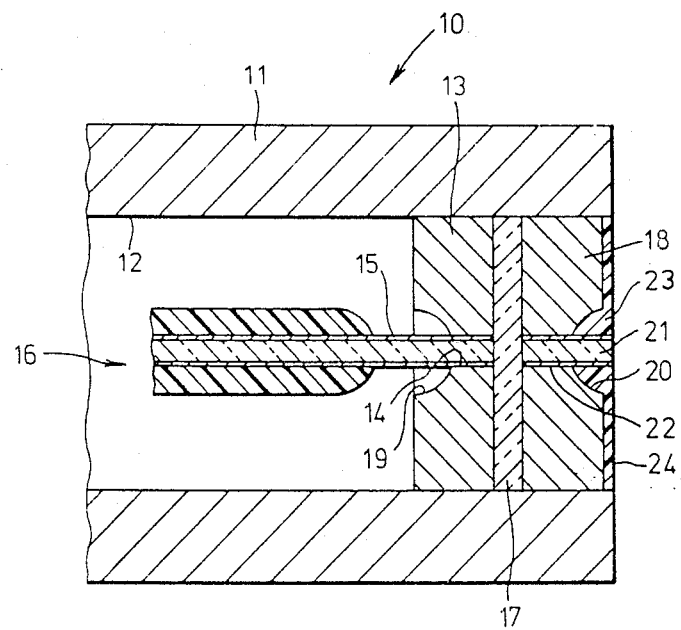

FIBER OPTIC CONNECTOR

CROSS-REFERENCE TO RELATED APPLICATION

This application is a continuation-in-part of our co-pending application Ser. No. 086,727, filed Oct. 22, 1979, and now abandoned.

BACKGROUND OF THE INVENTION

This invention relates to optical fiber couplings and, in particular, to fiber splices and connectors of the type in which watch bearing jewels are employed to align two fibers to be coupled.

Optical fiber connectors or splices of the type in which one or more watch bearing jewels are employed to align a pair of fibers are increasingly in common use in the construction of fiber optic transmission systems. A well known problem with such connectors or splices, when used with plastic coated, clad silica fibers, is the phenomenon of "growing out" of the fiber ends. After the fiber end has been stripped of its coating and fitted to the connector or splice, the coating immediately adjacent the fiber end tends to relax and force the fiber end further into the connector. Such movement of the fiber can cause damage to the fiber end and/or the connector itself.

We have previously designed a termination for a plastic coated optical fiber having a bared end portion. The termination includes a body having a cylindrical outer reference surface, a coaxial inner bore for receiving the coated fiber and alignment means for locating the fiber end coaxial with the inner bore. A transparent flat protection window is arranged adjacent and normal to the fiber end.

The purpose of the window is to protect the fiber end from damage when coupling to a similar connector member. The window introduces only a relatively small coupling loss.

In certain applications it is advantageous to reduce even the small coupling loss introduced by such a protection window to a minimum. This may be done by reducing the thickness of the window so that, when the connector member is mated with a similar member, the two fibers being coupled are virtually in contact, being separated only by two very thin windows. However, it has been found that such reduced thickness windows are fragile and tend to be fractured by the fiber itself which, when "growing out" occurs, exerts a considerable pressure on the window.

SUMMARY OF THE INVENTION

According to the principal aspect of the invention there is provided an optical fiber termination for a plastic coated fiber. The termination comprises a tubular body member having alignment means for receiving and aligning the fiber coaxial with the body member. An optical fiber stub is mounted in the bore of a watch bearing jewel positioned adjacent to and in front of the alignment means. A transparent protective window is disposed between the fiber alignment means and the bearing jewel against which the fiber and the fiber stub abut, whereby the fiber and the fiber stub are coupled optically via the window.

BRIEF DESCRIPTION OF THE DRAWING

The drawing shows a cross sectional view of the optical fiber connector member of the invention terminated to a fiber of the plastic coated clad type.

DESCRIPTION OF THE PREFERRED EMBODIMENTS

Referring now to the drawing in detail, the optical fiber connector member 10 depicted therein includes a tubular e.g. metal ferrule 11 and the outer surface of which provides a reference surface for mating with a similar connector member. The ferrule 11 has an accurately machined coaxial bore 12 into one of which a watch bearing jewel 13 is fitted. The bore 14 of the jewel 13 is of such a size as to receive and locate the bared end 15 of a plastic coated optical fiber 16. A relatively thin flat transparent window 17 is placed adjacent to and in front of the jewel 13 and is held in place by a second jewel 18 fitted into the ferrule bore 12. The jewels 13 and 18 are preferably of the single oil cup type and are arranged back-to-back, i.e. with their respective oil cups 19 and 20 facing away from one another.

The jewel 18 is provided with a clad optical fiber stub 21 located in the bore 22 of the jewel and secured to the jewel by a quantity of a cured epoxy resin adhesive material 23. The epoxy resin is polished flat on both the front and back face of the jewel 18 so that the fiber stub 21, which is supported by the resin, is flush with the front and back resin surfaces. In some applications the window may be affixed to the jewel 18 by means of the resin 23 thus providing a reference surface for the fiber stub 21 and eliminating one polishing step. In order that the resin 23 should be sufficiently hard to polish readily and resist wear when in use, it is preferred to load the resin with a powdered filler material.

The jewel 18 together with its fiber stub 21 is pressed into the end of the ferrule bore such that the window 17 firmly abuts the jewel 13, the front face 24 of the resin coated jewel 18 being flush with or slightly protruding from the end of the ferrule 11. The face 24 of the resin coated jewel 18 then provides a mating surface for coupling to a similar connector member. The jewel 18 together with the fiber stub 21 provide a support for the window 17 and thus prevent punch-through of the fiber end 15 arising from axial pressure on that fiber end The optical fiber 16 to which the connector assembly is to be terminated may be secured within the ferrule bore by a body of an adhesive material, not shown. Alternatively the ferrule 11 may be crimped onto the fiber 16.

A typical assembly sequence of the connector shown in the drawing is as follows.

The jewel 13 is first pressed into the ferrule and the assembly is then fitted to the prepared end of the fiber 15. This fiber may be of the plastic, e.g. polypropylene, coated silicone resin clad silica type and is prepared by cleaving the fiber perpendicular to its axis and then removing the plastic coating adjacent to the cleaved end. The cladding is not removed from the fiber. The window 17 is then inserted adjacent the jewel 13 and the second jewel 18 is pressed into the ferrule thereby locating the window 17. A cleaved and bored fiber end is inserted into the bore 22 of the jewel 18 and is retained therein with an epoxy resin material. When the resin has cured, it is polished flush with the ferrule end, at the same line forming the fiber stub 21.

By way of example, and not by limitation, the bore 14 of the jewel 13 is chosen to have a clearance of about 2-10 microns on the bared fiber end 15 and the bore 22 of the jewel 18 has a like clearance on the fiber stub 21. The window 17 may be formed of silica having a refractive index of 1.48 or sapphire having a refractive index of 1.78. Sapphire is preferred as it is harder than silica and is easier to polish in thin sections. Typically, the window thickness is 50 microns. The fiber stub 2 has a similar core diameter to that of fiber 16 and has an equal or greater numerical aperture. Some optimization of connector loss can be achieved by making the core diameter of stub 21 greater than the core diameter of fiber 15 by an amount corresponding to the alignment tolerances in the connector member.

Various modifications of the connector arrangement will be apparent to those skilled in the art. Thus, the jewels 13 and 18 may be replaced by plain bearing jewels, i.e. of the type not provided with an oil cup, the consequent greater length of the bore of such jewels providing additional alignment of the fiber end 15 and the fiber stub 21. In a further application the window 17 may comprise a central light guiding portion, e.g. a very short fiber stub, surrounded by a support region of a relatively low refractive index, not shown. In a further modification the jewel 18 with its fiber stub 21 may be prepared prior to insertion in the ferrule, i.e. the stub is resin potted and the arrangement is polished, prior to insertion into the ferrule. The jewel 18 may then be fitted with its oil cup facing inwardly. In this way a very accurate alignment of the fiber stub 21 at the front face of the connector member is provided.

The connector member described herein is intended for use with fibers of the plastic coated resin clad silica type such as are employed in the construction of optical communication systems. The connector may of course also be used with other types of clad optical fibers.

In a further embodiment the double jewel and window technique may be applied to the construction of an optical fiber splice. In such an arrangement the fiber stub 21 of the jewel 18 is replaced by a second optical fiber (not shown) the arrangement being sealed in a suitable protective housing.

What is claimed is:

1. An optical fiber termination member for a plastic coated fiber comprising:
    a tubular body member having alignment means for receiving and aligning a fiber coaxial within the body member;
    a watch bearing jewel positioned adjacent to and in front of said alignment means;
    an optical fiber stub mounted in the bore in said jewel, said fiber stub having a length substantially the same as the axial length of said jewel; and
    a transparent solid protective window disposed between said alignment means and said jewel against which the fiber to be terminated and said fiber stub abut whereby the fiber and said fiber stub will be coupled optically via said window.

2. An optical fiber termination member as set forth in claim 1 wherein:
    said alignment means comprises a second watch bearing jewel.

3. An optical fiber termination member as set forth in claim 1 wherein:
    said fiber stub is retained in said watch bearing jewel by a body of a cured epoxy resin material, said resin body and said fiber stub being polished perpendicular to said body member axis so as to provide a mating surface for a similar termination member.

4. An optical fiber termination member as set forth in claim 3 wherein:
    said epoxy resin is filled with a solid particulate material.

5. An optical fiber termination comprising:
    a plastic coated, clad optical fiber, said fiber having an end from which said plastic coating has been stripped;
    a connector member including a tubular ferrule;
    a first watch bearing jewel located in the ferrule bore receiving and aligning said stripped fiber and;
    a transparent window disposed adjacent to and in front of said jewel against which said fiber end abuts;
    a second watch bearing jewel located in said ferrule bore in front of and abutting said window; and
    an optical fiber stub located in the bore of said second jewel in abutment with said window, whereby said fiber end and said fiber stub are optically coupled across said window and said stub supports said window against axial pressure from said fiber.

6. A coupling arrangement for first and second clad optical fibers comprising:
    a tubular ferrule;
    first and second watch bearing jewels located in the ferrule bore each receiving a respective fiber end; and
    a relatively thin, flat, solid transparent window trapped between the opposite faces of said first and second jewels against which said fiber ends abut, said fiber ends being optically coupled via said window.

* * * * *